United States Patent
Baghel et al.

(10) Patent No.: US 12,047,808 B2
(45) Date of Patent: *Jul. 23, 2024

(54) CONGESTION CONTROL AND PRIORITY HANDLING IN DEVICE-TO-DEVICE (D2D) COMMUNICATIONS

(71) Applicant: QUALCOMM Incorporated, San Diego, CA (US)

(72) Inventors: Sudhir Kumar Baghel, Pleasanton, CA (US); Junyi Li, Fairless Hills, PA (US); Shailesh Patil, San Diego, CA (US); Kapil Gulati, Belle Mead, NJ (US); Wanshi Chen, San Diego, CA (US); Arjun Bharadwaj, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/167,389

(22) Filed: Feb. 10, 2023

(65) Prior Publication Data

US 2023/0189063 A1 Jun. 15, 2023

Related U.S. Application Data

(63) Continuation of application No. 16/660,595, filed on Oct. 22, 2019, now Pat. No. 11,582,635.

(Continued)

(51) Int. Cl.
*H04W 28/02* (2009.01)
*H04W 40/12* (2009.01)
(Continued)

(52) U.S. Cl.
CPC ... *H04W 28/0289* (2013.01); *H04W 28/0268* (2013.01); *H04W 40/12* (2013.01);
(Continued)

(58) Field of Classification Search
CPC ............. H04W 28/0289; H04W 76/27; H04W 28/0268; H04W 40/12; H04W 72/044;
(Continued)

(56) References Cited

U.S. PATENT DOCUMENTS 9,143,409 B2 * 9/2015 Laufer ................... H04L 41/12
11,582,635 B2 2/2023 Baghel et al.
(Continued)

FOREIGN PATENT DOCUMENTS

| CN | 101964796 A | 2/2011 |
|---|---|---|
| CN | 105981454 A | 9/2016 |
| WO | 2021081689 | 5/2021 |

OTHER PUBLICATIONS

Co-pending U.S. Appl. No. 17/754,347, filed Oct. 28, 2019.
(Continued)

*Primary Examiner* — Ajay Cattungal
(74) *Attorney, Agent, or Firm* — Harrity & Harrity, LLP/QUALCOMM Incorporated

(57) ABSTRACT

Various aspects of the present disclosure generally relate to wireless communication. In some aspects, a first wireless communication device may iterate a value of a channel access counter (CAC) to a trigger value based at least in part on configuring the value of the CAC. In some aspects, the first wireless communication device may utilize a channel access mechanism to select a set of time-frequency resources for a transmission of a packet based at least in part on iterating the value of the CAC to the trigger value. In some aspects, the first wireless communication device may transmit the packet to a second wireless communication device via the set of time-frequency resources based at least in part on utilizing the channel access mechanism to select the set of time-frequency resources for the transmission. Numerous other aspects are provided.

32 Claims, 5 Drawing Sheets

Related U.S. Application Data

(60) Provisional application No. 62/754,253, filed on Nov. 1, 2018.

(51) Int. Cl.
*H04W 72/044* (2023.01)
*H04W 72/56* (2023.01)
*H04W 74/00* (2009.01)
*H04W 74/0808* (2024.01)
*H04W 76/27* (2018.01)

(52) U.S. Cl.
CPC ......... *H04W 72/044* (2013.01); *H04W 72/56* (2023.01); *H04W 74/002* (2013.01); *H04W 74/0808* (2013.01); *H04W 76/27* (2018.02)

(58) Field of Classification Search
CPC ............... H04W 72/10; H04W 74/002; H04W 74/0808
See application file for complete search history.

(56) References Cited

U.S. PATENT DOCUMENTS

| | | |
|---|---|---|
| 2013/0083658 A1 | 4/2013 | Vasseur et al. |
| 2016/0174122 A1* | 6/2016 | Sorrentino ............ H04W 36/22 370/331 |
| 2016/0286601 A1 | 9/2016 | Siomina et al. |
| 2017/0195887 A1* | 7/2017 | Jovancevic ........... H04W 4/021 |
| 2017/0311191 A1* | 10/2017 | Khawer ................ H04W 24/10 |
| 2017/0359151 A1 | 12/2017 | Huang et al. |
| 2020/0145874 A1 | 5/2020 | Baghel et al. |

OTHER PUBLICATIONS

International Preliminary Report on Patentability—PCT/US2019/057585 The International Bureau of WIPO—Geneva, Switzerland, dated May 14, 2021.
International Search Report and Written Opinion—PCT/US2019/057585—ISA/EPO—dated Jan. 24, 2020.

\* cited by examiner

CONGESTION CONTROL AND PRIORITY HANDLING IN DEVICE-TO-DEVICE (D2D) COMMUNICATIONS

CROSS-REFERENCE TO RELATED APPLICATION

This application is a continuation of U.S. patent application Ser. No. 16/660,595, filed Oct. 22, 2019 (now U.S. Pat. No. 11,582,635), entitled "CONGESTION CONTROL AND PRIORITY HANDLING IN DEVICE-TO-DEVICE (D2D) COMMUNICATIONS," which claims priority to U.S. Provisional Patent Application No. 62/754,253, filed on Nov. 1, 2018, entitled "CONGESTION CONTROL AND PRIORITY HANDLING IN DEVICE-TO-DEVICE (D2D) COMMUNICATIONS," the contents of which are incorporated herein by reference in their entireties.

INTRODUCTION

Aspects of the present disclosure generally relate to wireless communication, and more particularly to techniques and apparatuses for congestion control and priority handling in device-to-device (D2D) communications.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a first wireless communication device, may include iterating a value of a channel access counter (CAC) to a trigger value based at least in part on configuring the value of the CAC. The method may include utilizing a channel access mechanism to select a set of time-frequency resources for a transmission of a packet based at least in part on iterating the value of the CAC to the trigger value. The method may include transmitting the packet to a second wireless communication device via the set of time-frequency resources based at least in part on utilizing the channel access mechanism to select the set of time-frequency resources for the transmission.

In some aspects, a first wireless communication device for wireless communication may include memory and one or more processors operatively coupled to the memory. The memory and the one or more processors may be configured to iterate a value of a channel access counter (CAC) to a trigger value based at least in part on configuring the value of the CAC. The memory and the one or more processors may be configured to utilize a channel access mechanism to select a set of time-frequency resources for a transmission of a packet based at least in part on iterating the value of the CAC to the trigger value. The memory and the one or more processors may be configured to transmit the packet to a second wireless communication device via the set of time-frequency resources based at least in part on utilizing the channel access mechanism to select the set of time-frequency resources for the transmission.

In some aspects, a non-transitory computer-readable medium may store one or more instructions for wireless communication. The one or more instructions, when executed by one or more processors of a first wireless communication device, may cause the one or more processors to iterate a value of a channel access counter (CAC) to a trigger value based at least in part on configuring the value of the CAC. The one or more instructions, when executed by the one or more processors, may cause the one or more processors to utilize a channel access mechanism to select a set of time-frequency resources for a transmission of a packet based at least in part on iterating the value of the CAC to the trigger value. The one or more instructions, when executed by the one or more processors, may cause the one or more processors to transmit the packet to a second wireless communication device via the set of time-frequency resources based at least in part on utilizing the channel access mechanism to select the set of time-frequency resources for the transmission.

In some aspects, an apparatus for wireless communication may include means for iterating a value of a channel access counter (CAC) to a trigger value based at least in part on configuring the value of the CAC. The apparatus may include means for utilizing a channel access mechanism to select a set of time-frequency resources for a transmission of a packet based at least in part on iterating the value of the CAC to the trigger value. The apparatus may include means for transmitting the packet to another apparatus via the set of time-frequency resources based at least in part on utilizing the channel access mechanism to select the set of time-frequency resources for the transmission.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
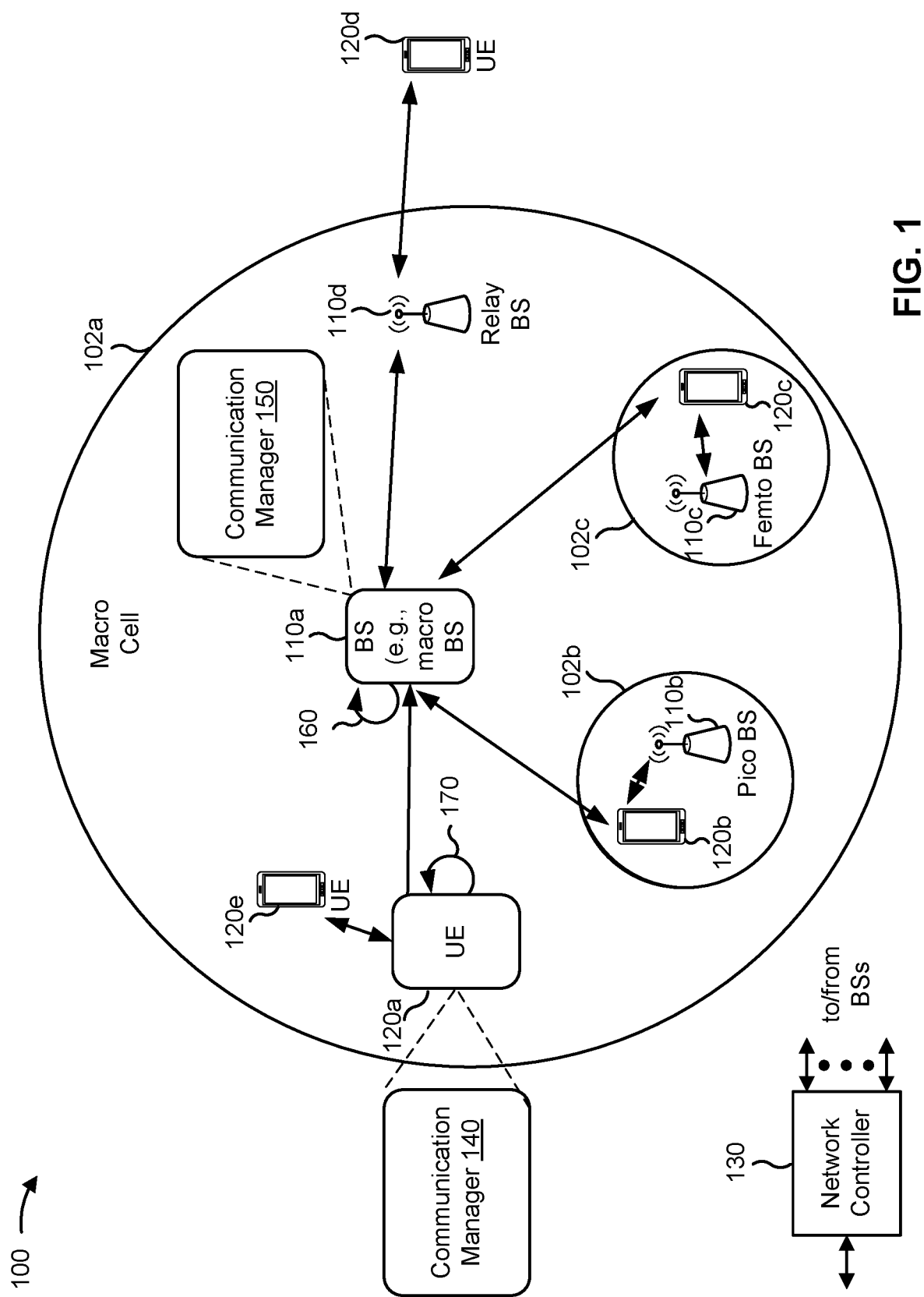
FIG. 1 is a block diagram conceptually illustrating an example of a wireless communication network, in accordance with various aspects of the present disclosure.

A wireless communication device, such as a user equipment (UE), a base station (BS), and/or the like, may perform device-to-device communications. For example, the wireless communication device may perform sidelink communications with another wireless communication device, where the sidelink communications include control information and/or data. The control information may include information needed to decode the data, such as information that identifies a start resource block of the data, a length of allocation of resource blocks for the data, a quantity of slots associated with the data, a modulation coding scheme (MCS) associated with the data, a link identifier, a destination identifier, and/or a source identifier for a wireless communication device associated with the data (e.g., to facilitate feedback when the data is not decoded), and/or the like.

In some D2D networks, such as vehicle-to-everything (V2X) networks or other D2D networks, the wireless communication device may use a distributed channel access mechanism (e.g., a random resource selection mechanism, a listen-before-talk (LBT)-based selection mechanism, a request-response (REQ-RESP)-based resource selection mechanism (e.g., with transmit and/or receive yielding), a long-term sensing-based resource selection mechanism, and/or the like) for time-frequency resource selection for D2D communications.

Use of distributed channel access mechanisms can cause unavoidable collisions among transmitters, such as devices using such a distributed channel access mechanisms to access a channel. In some networks, resource overhead for channel contention may be based at least in part on which channel access mechanism is used. A probability of a collision (e.g., a spatial reuse of time-frequency resources) may depend on the channel access mechanism that is used. For example, using a random resource selection mechanism where multiple wireless communication devices select a set of time-frequency resources in a distributed manner may result in a highest probability of a collision relative to other channel selection mechanisms, and may not increase a resource overhead for channel contention. As another example, using an LBT-based selection mechanism, where zones of guarded time-frequency resources are generated for various transmitters and/or receivers, results in a relatively low probability of a collision (on average) compared to other channel selection mechanisms. Continuing with the previous example and when using an LBT-based selection mechanism, a wireless communication device transmits in a first symbol or a third symbol based at least in part on a generated LBT counter, or transmits after performing random selection on a fraction of time-frequency resources in a slot when contending for the time-frequency resources. While some channel access mechanisms reduce a probability of collision when distributed channel access mechanisms are used, the reduction results in high resource overhead.

Some techniques and apparatuses described herein provide for determining channel access priority for packets when wireless communication devices associated with a network are using distributed channel access mechanisms. For example, some techniques and apparatuses described herein provide for determining a manner in which to prioritize different packets in high channel load (e.g., congestion) environments. This channel access priority determination may be based at least in part on a window of candidate resources. Packets with different priorities may have differently sized windows. A packet may be assigned a channel access counter (CAC) value based at least in part on the window of the packet. Channel access for the packet may be based at least in part on incrementing the value of the CAC, so that packets with different priorities (and thus differently sized windows and different CACs) are handled differently.

This improves a use of distributed channel access mechanisms to reduce or eliminate a probability of a collision among packets from different wireless communication devices while using less resource overhead relative to other channel access mechanisms. In addition, this improves D2D communications of a wireless communication device by reducing or eliminating a probability of a collision. Further, this conserves processing resources of a wireless communication device that would otherwise be consumed as a result of a collision between packets from the wireless communication device and another wireless communication device.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be an LTE network, a 5G or NR network, future generation-based networks, and/or the like. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

As shown in FIG. 1, the UE 120 may include a communication manager 140. As described in more detail elsewhere herein, the communication manager 140 may iterate a value of a channel access counter (CAC) based at least in part on a configured value of the CAC, may determine that the value of the CAC satisfies a trigger value, may utilize a channel access mechanism to select a set of time-frequency resources for a transmission of a packet based at least in part on the value of the CAC satisfying the trigger value, and may transmit the packet to a second wireless communication device via the selected set of time-frequency resources based at least in part on utilizing the channel access mechanism to select the set of time-frequency resources for the transmission. Additionally, or alternatively, the communication manager 140 may perform one or more other operations described herein.

Similarly, the base station 110 may include a communication manager 150. As described in more detail elsewhere herein, the communication manager 150 may iterate a value of a CAC based at least in part on a configured value of the CAC, may determine that the value of the CAC satisfies a trigger value, may utilize a channel access mechanism to select a set of time-frequency resources for a transmission of a packet based at least in part on the value of the CAC satisfying the trigger value, and may transmit the packet to a second wireless communication device via the selected set of time-frequency resources based at least in part on utilizing the channel access mechanism to select the set of time-frequency resources for the transmission. Additionally, or alternatively, the communication manager 150 may perform one or more other operations described herein.

As shown by reference number 160, BS 110 may iterate a value of a CAC based at least in part on a configured value of the CAC, may determine that the value of the CAC satisfies a trigger value, may utilize a channel access mechanism to select a set of time-frequency resources for a transmission of a packet based at least in part on the value of the CAC satisfying the trigger value, and may transmit the packet to a second wireless communication device via the selected set of time-frequency resources based at least in part on utilizing the channel access mechanism to select the set of time-frequency resources for the transmission, as described elsewhere herein. For example, BS 110 may perform these operations for congestion control and priority handling in D2D communications.

As shown by reference number 170, UE 120 may iterate a value of a CAC based at least in part on a configured value of the CAC, may determine that the value of the CAC satisfies a trigger value, may utilize a channel access mechanism to select a set of time-frequency resources for a transmission of a packet based at least in part on the value of the CAC satisfying the trigger value, and may transmit the packet to a second wireless communication device via the selected set of time-frequency resources based at least in part on utilizing the channel access mechanism to select the set of time-frequency resources for the transmission, as described elsewhere herein. For example, UE 120 may perform these operations for congestion control and priority handling in D2D communications.

As indicated above, FIG. 1 is provided merely as an example. Other examples may differ from what is described with regard to FIG. 1.

Figure 2:
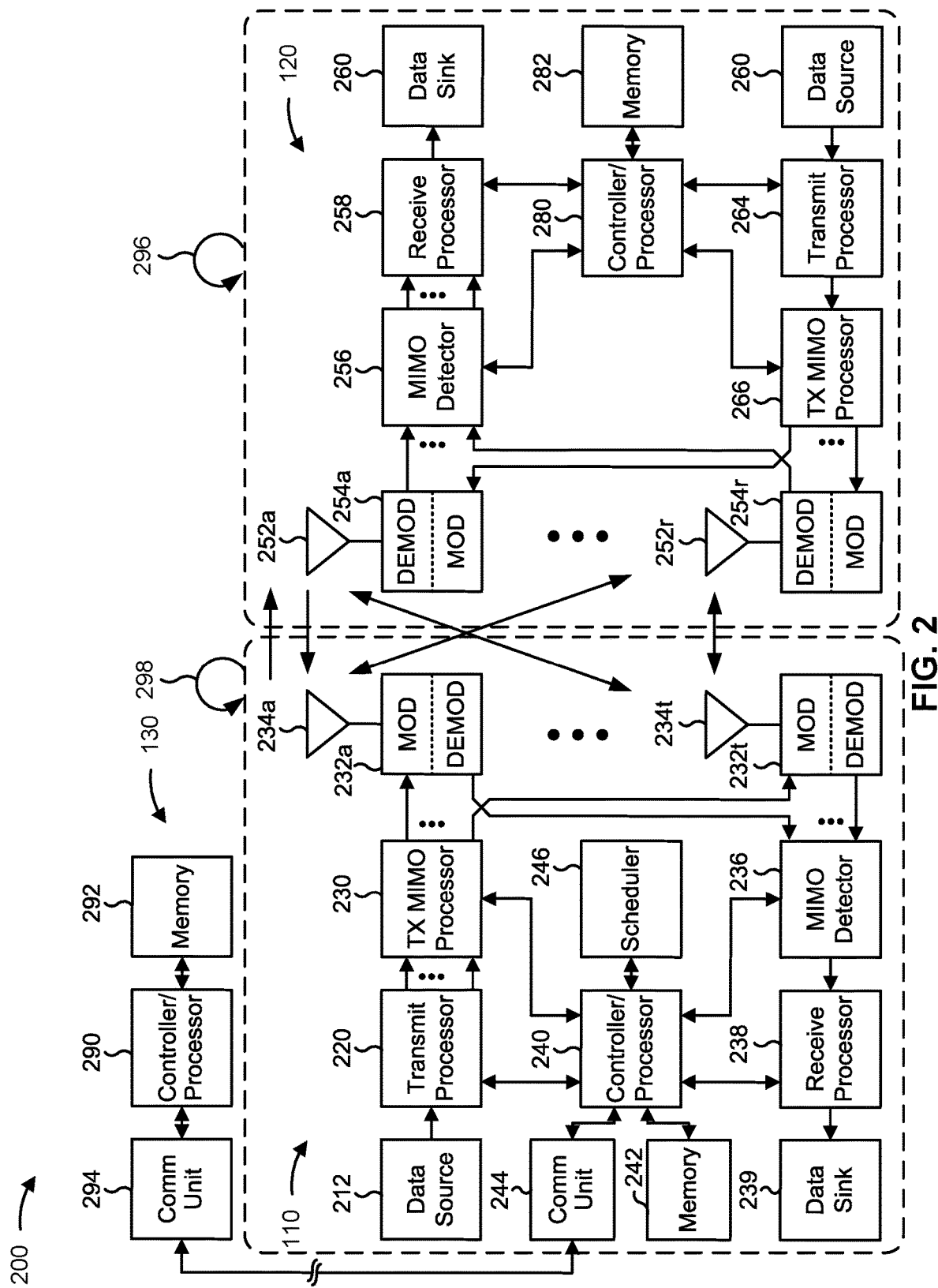
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with congestion control and priority handling in D2D communications, as described in more detail elsewhere herein. For example, controller/processor 240 of base station 110, controller/processor 280 of UE 120, and/or any other component(s) of FIG. 2 may perform or direct operations of, for example, process 500 of FIG. 5, and/or other processes as described herein. Memories 242 and 282 may store data and program codes for base station 110 and UE 120, respectively. A scheduler 246 may schedule UEs for data transmission on the downlink and/or uplink.

In some aspects, and as shown by reference number 296, the UE 120 may include means for iterating a value of a CAC based at least in part on a configured value of the CAC, means for determining that the value of the CAC satisfies a trigger value, means for utilizing a channel access mechanism to select a set of time-frequency resources for a transmission of a packet based at least in part on the value of the CAC satisfying the trigger value, means for transmitting the packet to a second wireless communication device via the selected set of time-frequency resources based at least in part on utilizing the channel access mechanism to select the set of time-frequency resources for the transmission, means for configuring the value of the CAC for the packet prior to iterating the value of the CAC, means for determining, prior to iterating the value of the CAC, a quantity of candidate resources that is available in a slot, wherein a candidate resource has a size equal to a quantity of time-frequency resources to be used for the transmission of the packet, means for determining that the packet is ready to be transmitted prior to iterating the value of the CAC, means for determining, based at least in part on determining that the packet is ready to be transmitted, a transmission window for the transmission of the packet, means for utilizing the channel access mechanism to select the set of time-frequency resources for the transmission of the packet based at least in part on iterating the value of the CAC to the trigger value, means for iterating the value of the CAC by a fractional value of a quantity of time-frequency resources available in a slot, means for iterating the value of the CAC by a multiple of a fractional value of a quantity of time-frequency resources available in a slot, and/or the like. Additionally, or alternatively, the UE 120 may include means for performing one or more other operations described herein. In some aspects, such means may include the communication manager 140. Additionally, or alternatively, such means may include one or more components of the UE 120 described in connection with FIG. 2.

In some aspects, and as shown by reference number 298, the base station 110 may include means for iterating a value of a CAC based at least in part on a configured value of the CAC, means for determining that the value of the CAC satisfies a trigger value, means for utilizing a channel access mechanism to select a set of time-frequency resources for a transmission of a packet based at least in part on the value of the CAC satisfying the trigger value, means for transmitting the packet to a second wireless communication device via the selected set of time-frequency resources based at least in part on utilizing the channel access mechanism to select the set of time-frequency resources for the transmission, means for configuring the value of the CAC for the packet prior to iterating the value of the CAC, means for determining, prior to iterating the value of the CAC, a quantity of candidate resources that is available in a slot, wherein a candidate resource has a size equal to a quantity of time-frequency resources to be used for the transmission of the packet, means for determining that the packet is ready to be transmitted prior to iterating the value of the CAC, means for determining, based at least in part on determining that the packet is ready to be transmitted, a transmission window for the transmission of the packet, means for utilizing the channel access mechanism to select the set of time-frequency resources for the transmission of the packet based at least in part on iterating the value of the CAC to the trigger value, means for iterating the value of the CAC by a fractional value of a quantity of time-frequency resources available in a slot, means for iterating the value of the CAC by a multiple of a fractional value of a quantity of time-frequency resources available in a slot, and/or the like. Additionally, or alternatively, the base station 110 may include means for performing one or more other operations described herein. In some aspects, such means may include the communication manager 150. In some aspects, such means may include one or more components of the base station 110 described in connection with FIG. 2.

As indicated above, FIG. 2 is provided merely as an example. Other examples may differ from what is described with regard to FIG. 2.

Figure 3:
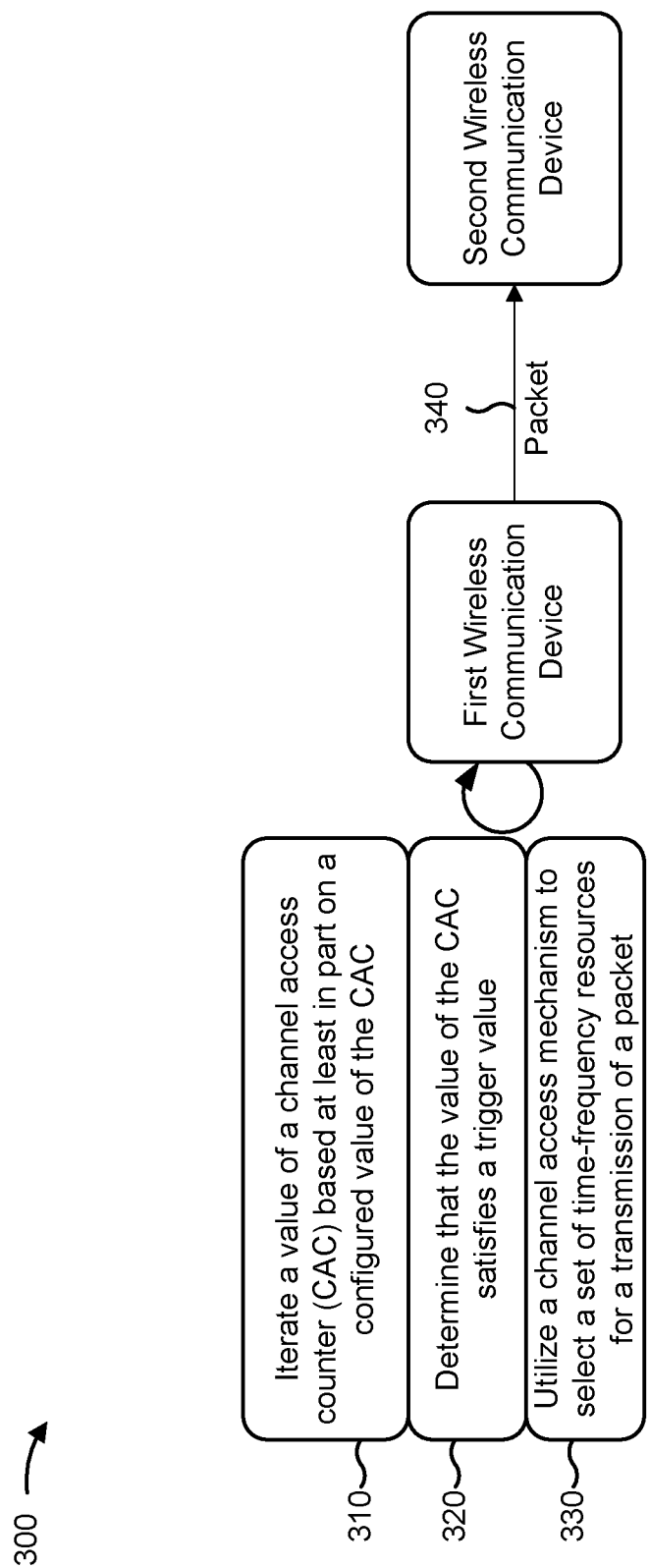
FIG. 3 is a diagram illustrating an example of congestion control and priority handling in device-to-device (D2D) communications, in accordance with various aspects of the present disclosure.

FIG. 3 is a diagram illustrating an example 300 of congestion control and priority handling in D2D communications, in accordance with various aspects of the present disclosure. As shown in FIG. 3, example 300 includes a first wireless communication device (e.g., a first BS 110, a first UE 120, and/or the like) and a second wireless communication device (e.g., a second BS 110, a second UE 120, and/or the like).

As shown by reference number 310, the first wireless communication device may iterate a value of a channel access counter (CAC) based at least in part on configuring the value of the CAC. For example, the first wireless communication device may configure the value of the CAC (e.g., by storing a starting value for the CAC in memory resources associated with the first wireless communication device) prior to iterating the value of the CAC. As shown by reference number 320, the first wireless communication device may determine that the value of the CAC satisfies a trigger value. In some aspects, the trigger value may be based at least in part on a size of a transmission window for a packet. In some aspects, a starting value for the CAC may be based at least in part on a size of a transmission window for a packet, as described elsewhere herein. A size of a transmission window may refer to a quantity of time-frequency resources associated with a transmission window. In some aspects, the starting value may be zero, and the trigger value may be a value between zero and the size of the transmission window.

In some aspects, the first wireless communication device may determine that a packet is ready to be transmitted. For example, the first wireless communication device (e.g., a component of the first wireless communication device and/or an application associated with the first wireless communication device) may generate a packet and the first wireless communication device may determine that the packet is ready to be transmitted based at least in part on the first wireless communication device generating the packet. In some aspects, the first wireless communication device may determine that the packet is ready to be transmitted prior to generating the value of the CAC and/or iterating the value of the CAC.

In some aspects, the first wireless communication device may determine a quantity of candidate resources that is available in a slot. For example, the first wireless communication device may determine the quantity of candidate resources that is available prior to generating the value of the CAC, prior to iterating the value of the CAC, based at least in part on determining that the packet is ready to be transmitted, and/or the like. In some aspects, a candidate resource represents a set of time-frequency resources that is available in a slot. In some aspects, a candidate resource may have a size that is equal to a quantity of time-frequency resources to be used for a transmission of the packet. For example, if 10 resource blocks are to be used for a transmission of the packet, then one candidate resource may represent 10 available resource blocks in a slot. Continuing with the previous example, if 20 resources blocks are available in a slot, then the first wireless communication device may determine that two candidate resources are available in the slot.

In some aspects, the first wireless communication device may determine a transmission window for the transmission of the packet. For example, the first wireless communication device may determine the transmission window based at least in part on determining that the packet is ready to be transmitted, prior to generating the value of the CAC, prior to iterating the value of the CAC, and/or the like. In some aspects, a size of the transmission window may be based at least in part on the quantity of candidate resources that is available in the slot. For example, if the first wireless communication device determines that two candidate resources are available in the slot, then the first wireless communication device may determine a transmission window for the packet that has a size of two candidate resources. Additionally, or alternatively, a size of the transmission window may be based at least in part on a quantity of slots associated with a transmission of the packet (e.g., a quantity of slots to be used for the transmission).

Additionally, or alternatively, and as another example, the first wireless communication device may determine a size of the transmission window based at least in part on a channel busy ratio (CBR) for a slot to be used for a transmission of the packet (e.g., a higher relative CBR may be associated with a larger sized transmission window), a quality of service (QoS) associated with the packet (e.g., a higher QoS may be associated with a smaller sized transmission window), and/or the like. Additionally, or alternatively, and as another example, the first wireless communication device may be pre-configured with information (e.g., via a radio resource control (RRC) configuration) that identifies a mapping between various quantities of candidate resources available and corresponding transmission window sizes.

In some aspects, a size of the transmission window may be based at least in part on a priority associated with the packet. For example, different priority packets may be associated with different sized transmission windows. Continuing with the previous example, the first wireless communication device may determine a smaller transmission window (e.g., with a smaller relative quantity of time-frequency resources) for a packet with a higher priority relative to another packet. This may increase a quantity of potential opportunities to transmit a packet relative to a larger transmission window by reducing a quantity of available time-frequency resources that need to be available to transmit a packet. In some aspects, the first wireless communication device may be configured (e.g., pre-configured) with information (e.g., via an RRC configuration) that identifies a mapping between various priorities and corresponding sizes of transmission windows.

In some aspects, the first wireless communication device may generate the CAC and/or the value of the CAC. For example, the first wireless communication device may store information identifying the CAC in memory resources, may store information identifying a starting value of the CAC, a current value of the CAC, a trigger value of the CAC, and/or the like in the memory resources. In some aspects, the first wireless communication device may generate different CACs and/or different values for different CACs for different packets, for different sets of packets, and/or the like.

In some aspects, the first wireless communication device may determine a starting value for the CAC. For example, the first wireless communication device may determine the starting value after, or in association with, configuring the value of the CAC, prior to iterating the value of the CAC, and/or the like. In some aspects, the starting value may be equal to zero (e.g., when the first wireless communication device is to iterate the value of the CAC in an increasing manner), may be equal to the quantity of candidate resources that is available in a slot (e.g., when the first wireless communication device is to iterate the value of the CAC in a decreasing manner), and/or the like. In some aspects, the first wireless communication device may determine different starting values for different CACs (e.g., associated with different packets, with different priorities, and/or the like).

In some aspects, the first wireless communication device may iterate the value of the CAC after, or based at least in part on, determining the starting value for the CAC. In some aspects, the first wireless communication device may iterate the value of the CAC by an amount equal to a quantity of elapsed candidate resources available in a slot. For example, if two available candidate resources have elapsed in a slot, then the first wireless communication device may iterate the value of the CAC by two. In some aspects, the first wireless communication device may iterate the value of the CAC by a quantity of elapsed available slots associated with a transmission window. For example, if a transmission of a packet is to use one or more slots (e.g., one or more slots are associated with a transmission window for the packet), then the first wireless communication device may iterate the value of the counter by a quantity of elapsed available slots. In some aspects, the first wireless communication device may iterate the value of the CAC based at least in part on a CBR for a slot to be used for the transmission of the packet (e.g., the first wireless communication device may iterate the value of the CAC by a lower relative value for a higher relative CBR), a priority of the packet (e.g., the first wireless communication device may iterate the value by a higher relative value for a higher relative priority), a quality of service (QoS) associated with the packet (e.g., the first wireless communication device may iterate the value of the CAC by a higher relative value for a higher relative QoS), and/or the like.

In some aspects, the first wireless communication device may iterate the value of the CAC by a fractional value of a quantity of time-frequency resources available in a slot. For example, the first wireless communication device may iterate the value of the CAC by a fractional value, rather than by an integer value. In some aspects, the fractional value may be based at least in part on a quantity of available time-frequency resources in a slot that has an amount of energy and/or power (e.g., in decibels (dBm)) that satisfies a configured threshold. For example, if 40 percent (e.g., 0.4) of the time-frequency resources in a slot have an amount of energy and/or power that is less than a threshold, then the first wireless communication device may iterate the value of the CAC by 0.6 (e.g., 1.0-0.4) based at least in part on 60% of the time-frequency resources having an amount of energy that is greater than or equal to the threshold, rather than pausing the iterating of the value.

In some aspects, whether the first wireless communication device iterates the value of the CAC or pauses the iteration of the value of the CAC when a fractional amount of time-frequency resources (e.g., a fractional amount of a total quantity of time-frequency resources) associated with a candidate resource are available may be based at least in part on the fractional amount satisfying a threshold. For example, the first wireless communication device may pause the iteration of the value (e.g., may not iterate the value) if the fractional amount fails to satisfy a threshold, and may iterate the value (e.g., may not pause the iteration of the value) if the fractional amount satisfies the threshold. In some aspects, the threshold may be pre-configured to the first wireless communication device via an RRC configuration.

In some aspects, the first wireless communication device may iterate the value of the CAC by a multiple of a fractional value of a quantity of time-frequency resources available in a slot. For example, if a fractional amount of a quantity of time-frequency resources is available in a slot (e.g., associated with a candidate resource), then the first wireless communication device may iterate the value of the CAC by a multiple of the fractional value (e.g., by two times the fractional value, three times the fractional value, and/or so forth).

In some aspects, the multiple may be a fractional value or a non-fractional value. In some aspects, the multiple may be based at least in part on a priority associated with the packet. For example, different priorities may be associated with different multiples (e.g., a higher relative priority may be associated with a higher relative multiple). In some aspects, the multiple may be based at least in part on a QoS associated with the packet. For example, different QoS may be associated with different multiples (e.g., a higher relative QoS may be associated with a higher relative multiple). In some aspects, the multiple may be configured (e.g., pre-configured) to the first wireless communication device via an RRC configuration.

In some aspects, the first wireless communication device may iterate the value of the CAC by increasing the value of the CAC or by decreasing the value of the CAC. In some aspects, the first wireless communication device may iterate the value of the CAC to a trigger value. For example, satisfaction of the trigger value may cause the first wireless communication device to perform one or more actions, as described elsewhere herein.

In some aspects, if candidate resources are not available, then the first wireless communication device may pause the iterating of the value of the CAC. For example, when an unavailable candidate resource elapses, then the first wireless communication device may not iterate the value of the CAC. In some aspects, if the first wireless communication device has paused the iterating of the CAC, then the first wireless communication device may resume the iterating of the value of the CAC when candidate resources become available.

As shown by reference number 330, the first wireless communication device may utilize a channel access mechanism to select a set of time-frequency resources for a transmission of the packet. For example, the first wireless communication device may utilize the channel access mechanism based at least in part on iterating the value of the CAC to the trigger value or based at least in part on the value satisfying a trigger value (e.g., satisfying a threshold defined based at least in part on the trigger value). In some aspects, a channel access mechanism may include a random resource selection mechanism, an LBT-based mechanism, and/or the like.

As shown by reference number 340, the first wireless communication device may transmit the packet to the second wireless communication device via the set of time-frequency resources. For example, the first wireless communication device may transmit the packet to the second wireless communication device based at least in part on utilizing the channel access mechanism to select the set of time-frequency resources for a transmission of the packet.

As indicated above, FIG. 3 is provided as an example. Other examples may differ from what is described with respect to FIG. 3.

Figure 4:
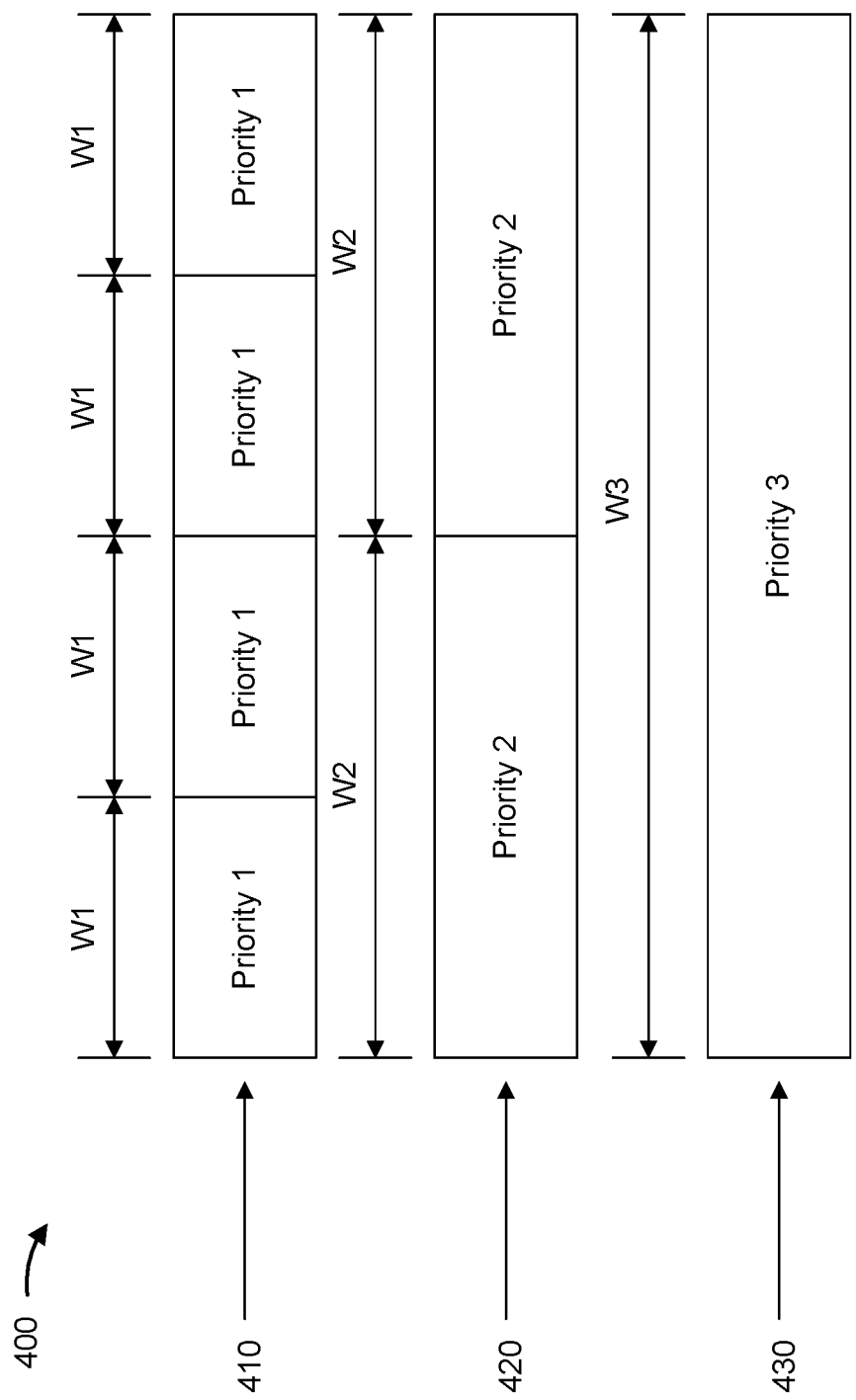
FIG. 4 is a diagram illustrating an example of congestion control and priority handling in device-to-device (D2D) communications, in accordance with various aspects of the present disclosure.

FIG. 4 is a diagram illustrating an example 400 of congestion control and priority handling in D2D communications, in accordance with various aspects of the present disclosure. FIG. 4 shows different sized transmission windows (W1 through W3) that may be used for packets associated with different priorities.

As shown by reference number 410, a first sized transmission window W1 may be used for packets associated with a first priority (e.g., priority 1). For example, priority 1 packets may have a higher priority relative to priority 2 packets and priority 3 packets described below. As such, and as further shown by reference number 410, W1 may be associated with a smaller quantity of time-frequency resources than W2 (associated with priority 2 packets) and W3 (associated with priority 3 packets). In some aspects, the smaller sized transmission window W1 may result in a wireless communication device transmitting priority 1 packets prior to priority 2 packets and/or priority 3 packets (e.g., based on faster iteration of the value of the CAC associated with priority 1 packets relative to priority 2 packets and priority 3 packets).

As shown by reference number 420, W2 may be used for priority 2 packets. For example, priority 2 packets may have a higher priority relative to priority 3 packets and may have a lower priority relative to priority 1 packets. As such, and as further shown by reference number 420, W2 may be associated with a smaller quantity of time-frequency resources than W3, but with a larger quantity of time-frequency resources than W1. In some aspects, the smaller sized transmission window W2 may result in a wireless communication device transmitting priority 2 packets prior to priority 3 packets (e.g., based on faster iteration of the value of the CAC associated with priority 2 packets relative to priority 3 packets).

As shown by reference number 430, W3 may be used for priority 3 packets. For example, priority 3 packets may have a lower priority relative to priority 1 packets and priority 2 packets. As such, and as further shown by reference number 430, W3 may be associated with a smaller quantity of time-frequency resources than W1 and W2. In some aspects, the larger sized transmission window may result in a wireless communication device transmitting priority 3 packets after priority 1 packets and after priority 2 packets (e.g., based on slower iteration of the value of the CAC associated with the priority 3 packets relative to priority 1 packets and priority 2 packets).

In some aspects, and as described elsewhere herein, a size of a transmission window may be based at least in part on a CBR associated with a slot. For example, the relative sizes of the transmission windows shown in FIG. 4 may be based at least in part on a CBR value associated with a slot to be used for a transmission of packets (e.g., priority 1 packets, priority 2 packets, and/or priority 3 packets).

As indicated above, FIG. 4 is provided as an example. Other examples may differ from what is described with respect to FIG. 4.

Figure 5:
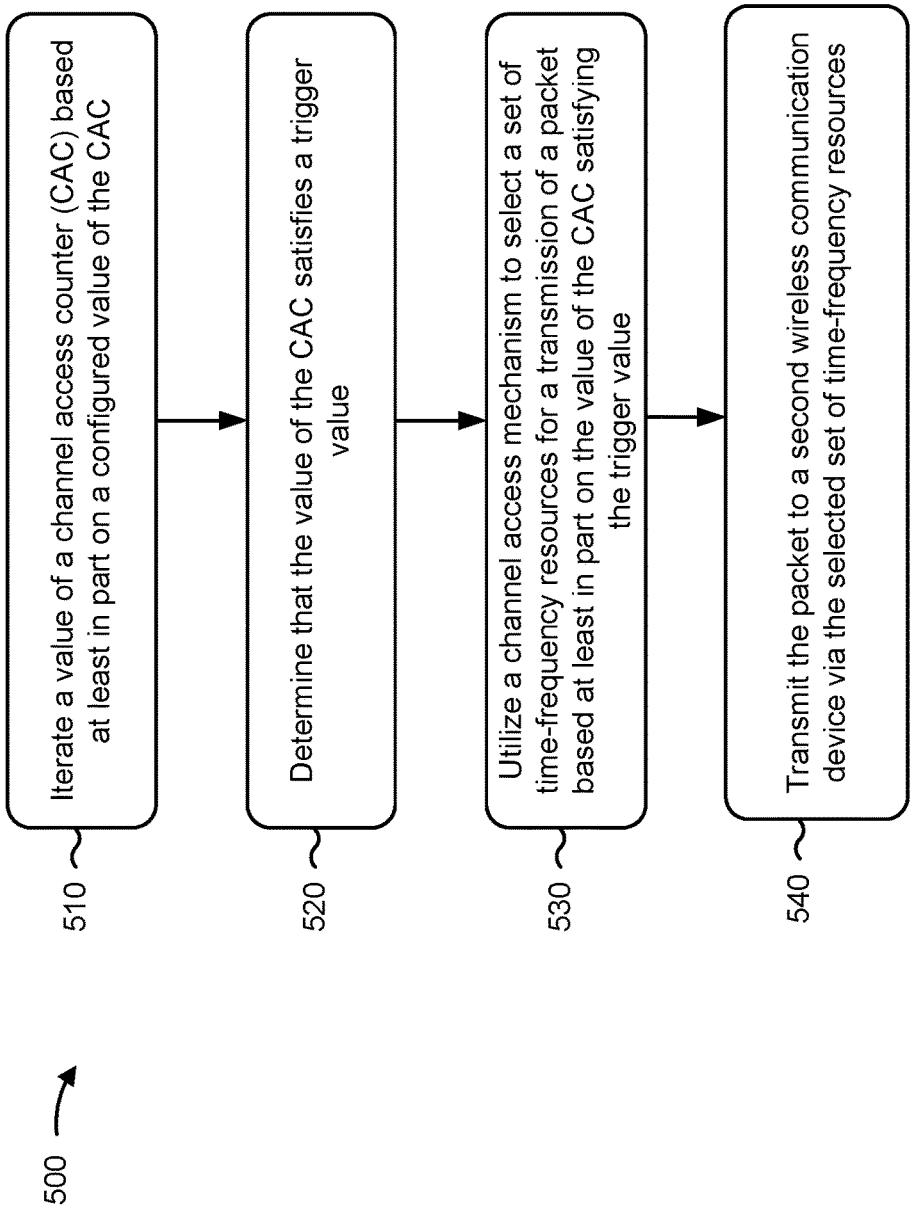
FIG. 5 is a diagram illustrating an example process performed, for example, by a wireless communication device, in accordance with various aspects of the present disclosure.

FIG. 5 is a diagram illustrating an example process 500 performed, for example, by a first wireless communication device, in accordance with various aspects of the present disclosure. Example process 500 is an example where a first wireless communication device (e.g., BS 110, UE 120, and/or the like) performs congestion control and priority handling in D2D communications.

As shown in FIG. 5, in some aspects, process 500 may include iterating a value of a channel access counter (CAC) based at least in part on configuring the value of the CAC (block 510). For example, the first wireless communication device (e.g., using controller/processor 240, controller/processor 280, and/or the like) may iterate a value of a channel access counter (CAC) based at least in part on configuring the value of the CAC, as described elsewhere herein.

As further shown in FIG. 5, in some aspects, process 500 may include determining that the value of the CAC satisfies a trigger value (block 520). For example, the first wireless communication device (e.g., using controller/processor 240, controller/processor 280, and/or the like) may determine that the value of the CAC satisfies a trigger value (e.g., a threshold defined by a trigger value). In some aspects, this may be based at least in part on iterating the value of the CAC to the trigger value.

As further shown in FIG. 5, in some aspects, process 500 may include utilizing a channel access mechanism to select a set of time-frequency resources for a transmission of a packet based at least in part on the value of the CAC satisfying the trigger value (block 530). For example, the first wireless communication device (e.g., using controller/processor 240, controller/processor 280, and/or the like) may utilize a channel access mechanism to select a set of time-frequency resources for a transmission of a packet based at least in part iterating the value of the CAC satisfying the trigger value, as described elsewhere herein.

As further shown in FIG. 5, in some aspects, process 500 may include transmitting the packet to a second wireless communication device via the set of time-frequency resources based at least in part on utilizing the channel access mechanism to select the set of time-frequency resources for the transmission (block 540). For example, the first wireless communication device (e.g., using controller/processor 240, transmit processor 220, TX MIMO processor 230, MOD 232, antenna 234, controller/processor 280, transmit processor 264, TX MIMO processor 266, MOD 254, antenna 252, and/or the like) may transmit the packet to a second wireless communication device via the set of time-frequency resources based at least in part on utilizing the channel access mechanism to select the set of time-frequency resources for the transmission, as described elsewhere herein.

Process 500 may include additional aspects, such as any single aspect or any combination of aspects described below and/or in connection with one or more other processes described elsewhere herein.

In a first aspect, process 500 includes configuring the value of the CAC for the packet prior to iterating the value of the CAC.

In a second aspect, alone or in combination with the first aspect, process 500 includes determining, prior to iterating the value of the CAC, a quantity of candidate resources that is available in a slot, wherein a candidate resource has a size equal to a quantity of time-frequency resources to be used for the transmission of the packet.

In a third aspect, alone or in combination with one or more of the first and second aspects, process 500 includes determining that the packet is ready to be transmitted prior to iterating the value of the CAC; and determining, based at least in part on determining that the packet is ready to be transmitted, a transmission window for the transmission of the packet.

In a fourth aspect, alone or in combination with one or more of the first through third aspects, a size of the transmission window is based at least in part on at least one of: the quantity of candidate resources that is available in the slot, a quantity of slots associated with the transmission, or a combination of the quantity of candidate resources that is available in the slot and the quantity of slots associated with the transmission.

In a fifth aspect, alone or in combination with one or more of the first through fourth aspects, the size of the transmission window is based at least in part on at least one of: a priority associated with the packet, a quality of service (QoS) value associated with the packet, or a combination of the priority and the QoS value.

In a sixth aspect, alone or in combination with one or more of the first through fifth aspects, the priority associated with the packet is identified in a radio resource control (RRC) configuration received from a third wireless communication device.

In a seventh aspect, alone or in combination with one or more of the first through sixth aspects, the value of the CAC has a starting value that is based at least in part on the size of the transmission window.

In an eighth aspect, alone or in combination with one or more of the first through seventh aspects, the trigger value is between zero and the size of the transmission window.

In a ninth aspect, alone or in combination with one or more of the first through eighth aspects, iterating the value of the CAC comprises: iterating the value of the CAC by an amount equal to at least one of: a quantity of elapsed candidate resources available in a slot, a quantity of elapsed available slots associated with a transmission window, or a combination of the quantity of elapsed candidate resources and the quantity of elapsed available slots.

In a tenth aspect, alone or in combination with one or more of the first through ninth aspects, utilizing the channel access mechanism comprises: utilizing the channel access mechanism to select the set of time-frequency resources for the transmission of the packet based at least in part on iterating the value of the CAC to the trigger value.

In an eleventh aspect, alone or in combination with one or more of the first through tenth aspects, the channel access mechanism includes at least one of: a random resource selection mechanism, a listen-before-talk (LBT)-based mechanism, or a combination of the random resource selection mechanism and the LBT-based mechanism.

In a twelfth aspect, alone or in combination with one or more of the first through eleventh aspects, iterating the value of the CAC comprises: iterating the value of the CAC by a fractional value of a quantity of time-frequency resources available in a slot.

In a thirteenth aspect, alone or in combination with one or more of the first through twelfth aspects, the fractional value is based at least in part on a quantity of available time-frequency resources in the slot that has an amount of energy that satisfies a configured threshold.

In a fourteenth aspect, alone or in combination with one or more of the first through thirteenth aspects, the configured threshold is pre-configured via a radio resource control (RRC) configuration.

In a fifteenth aspect, alone or in combination with one or more of the first through fourteenth aspects, iterating the value of the CAC comprises: iterating the value of the CAC by a multiple of a fractional value of a quantity of time-frequency resources available in a slot.

In a sixteenth aspect, alone or in combination with one or more of the first through fifteenth aspects, the multiple is a non-fractional value.

In a seventeenth aspect, alone or in combination with one or more of the first through sixteenth aspects, the multiple is another fractional value.

In an eighteenth aspect, alone or in combination with one or more of the first through seventeenth aspects, the multiple is based at least in part on at least one of: a priority associated with the packet, a quality of service (QoS) value associated with the packet, or a combination of the priority and the QoS value.

In a nineteenth aspect, alone or in combination with one or more of the first through eighteenth aspects, the priority associated with the packet, the QoS value associated with the packet, or the multiple are pre-configured via a radio resource control (RRC) configuration.

In a twentieth aspect, alone or in combination with one or more of the first through nineteenth aspects, a size of a transmission window for transmission of the packet, or a multiple of a fractional value of a quantity of time-frequency resources available in a slot, are based at least in part on at least one of: a channel busy ratio (CBR) for the slot to be used for the transmission of the packet, a priority of the packet, a quality of service (QoS) value of the packet, or a combination of the CBR for the slot, the priority of the packet, and the QoS value of the packet.

In a twenty-first aspect, alone or in combination with one or more of the first through twentieth aspects, an amount by which the value of the CAC is iterated is based at least in part on at least one of: a channel busy ratio (CBR) for a slot to be used for the transmission of the packet, a priority of the packet, or a combination of the CBR for the slot and the priority of the packet.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A wireless communication device for wireless communication, comprising:
   one or more memories; and
   one or more processors, coupled to the one or more memories, configured to:
      iterate a value of a channel access counter (CAC) based at least in part on a transmission window, wherein a size of the transmission window is based at least in part on at least one of:
         a quantity of candidate resources that is available in a slot,
         a quantity of slots associated with a transmission of a packet, or
         a combination of the quantity of candidate resources that is available in the slot and the quantity of slots associated with the transmission; and
      utilize a channel access mechanism based at least in part on that the value of the CAC satisfies a trigger value.

2. The wireless communication device of claim 1, wherein, to utilize the channel access mechanism, the one or more processors are configured to:
   utilize, based at least in part on the value of the CAC satisfying the trigger value, the channel access mechanism to select a set of time-frequency resources for the transmission.

3. The wireless communication device of claim 1, wherein the size of the transmission window is further based at least in part on at least one of:
   a priority associated with the packet,
   a quality of service (QoS) value associated with the packet, or
   a combination of the priority and the QoS value.

4. The wireless communication device of claim 1, wherein the value of the CAC has a starting value that is based at least in part on the size of the transmission window.

5. The wireless communication device of claim 1, wherein the trigger value is between zero and the size of the transmission window.

6. The wireless communication device of claim 1, wherein, to iterate the value of the CAC, the one or more processors are configured to:
   iterate, based on the transmission window, the value of the CAC by an amount equal to at least one of:
      a quantity of elapsed candidate resources available in the slot,
      a quantity of elapsed available slots associated with the transmission window, or
      a combination of the quantity of elapsed candidate resources and the quantity of elapsed available slots.

7. The wireless communication device of claim 1, wherein, to iterate the value of the CAC, the one or more processors are configured to:
   iterate, based on the transmission window, the value of the CAC by a fractional value of a quantity of time-frequency resources available in the slot.

8. The wireless communication device of claim 1, wherein, to iterate the value of the CAC, the one or more processors are configured to:
   iterate, based on the transmission window, the value of the CAC by a multiple of a fractional value of a quantity of time-frequency resources available in the slot.

9. The wireless communication device of claim 1, wherein the size of the transmission window is further based at least in part on at least one of:
   a channel busy ratio (CBR) for the slot to be used for the transmission of the packet,
   a priority of the packet,
   a quality of service (QoS) value of the packet, or
   a combination of the CBR for the slot, the priority of the packet, and the QoS value of the packet.

10. The wireless communication device of claim 1, wherein, to iterate the value of the CAC, the one or more processors are configured to:
    iterate, based on the transmission window, the value of the CAC by an amount that is based at least in part on at least one of:
       a channel busy ratio (CBR) for the slot,
       a priority of the packet, or
       a combination of the CBR for the slot and the priority of the packet.

11. The wireless communication device of claim 1, wherein the wireless communication device is a network node.

12. The wireless communication device of claim 1, wherein the wireless communication device is a user equipment.

13. A method of wireless communication performed at a wireless communication device, comprising:
    iterating a value of a channel access counter (CAC) based at least in part on a transmission window, wherein a size of the transmission window is based at least in part on at least one of:
       a quantity of candidate resources that is available in a slot,
       a quantity of slots associated with a transmission of a packet, or
       a combination of the quantity of candidate resources that is available in the slot and the quantity of slots associated with the transmission of the packet; and
    utilizing a channel access mechanism based at least in part on the value of the CAC satisfying a trigger value.

14. The method of claim 13, wherein utilizing the channel access mechanism comprises:
    utilizing, based at least in part on the value of the CAC satisfying the trigger value, the channel access mechanism to select a set of time-frequency resources for the transmission.

15. The method of claim 13, wherein the size of the transmission window is further based at least in part on at least one of:
    a priority associated with the packet,
    a quality of service (QoS) value associated with the packet, or
    a combination of the priority and the QoS value.

16. The method of claim 13, wherein the value of the CAC has a starting value that is based at least in part on the size of the transmission window.

17. The method of claim 13, wherein the trigger value is between zero and the size of the transmission window.

18. The method of claim 13, wherein iterating the value of the CAC comprises:
iterating, based on the transmission window, the value of the CAC by a fractional value of a quantity of time-frequency resources available in the slot.

19. The method of claim 13, wherein iterating the value of the CAC comprises:
iterating, based on the transmission window, the value of the CAC by a multiple of a fractional value of a quantity of time-frequency resources available in the slot.

20. The method of claim 13, wherein the size of the transmission window is further based at least in part on at least one of:
a channel busy ratio (CBR) for the slot to be used for the transmission of the packet,
a priority of the packet,
a quality of service (QoS) value of the packet, or
a combination of the CBR for the slot, the priority of the packet, and the QoS value of the packet.

21. The method of claim 13, wherein iterating the value of the CAC comprises:
iterating, based on the transmission window, the value of the CAC by an amount that is based at least in part on at least one of:
a channel busy ratio (CBR) for the slot,
a priority of the packet, or
a combination of the CBR for the slot and the priority of the packet.

22. A non-transitory computer-readable medium storing a set of instructions for wireless communication, the set of instructions comprising:
one or more instructions that, when executed by one or more processors of a wireless communication device, cause the wireless communication device to:
iterate a value of a channel access counter (CAC) based at least in part on a transmission window, wherein a size of the transmission window is based at least in part on at least one of:
a quantity of candidate resources that is available in a slot,
a quantity of slots associated with a transmission of a packet, or
a combination of the quantity of candidate resources that is available in the slot and the quantity of slots associated with the transmission of the packet; and
utilize a channel access mechanism based at least in part on the value of the CAC satisfying a trigger value.

23. The non-transitory computer-readable medium of claim 22, wherein the size of the transmission window is further based at least in part on at least one of:
a priority associated with the packet,
a quality of service (QoS) value associated with the packet, or
a combination of the priority and the QoS value.

24. The non-transitory computer-readable medium of claim 22, wherein the value of the CAC has a starting value that is based at least in part on the size of the transmission window.

25. The non-transitory computer-readable medium of claim 22, wherein the trigger value is between zero and the size of the transmission window.

26. The non-transitory computer-readable medium of claim 22, wherein the size of the transmission window is further based at least in part on at least one of:
a channel busy ratio (CBR) for the slot to be used for the transmission of the packet,
a priority of the packet,
a quality of service (QoS) value of the packet, or
a combination of the CBR for the slot, the priority of the packet, and the QoS value of the packet.

27. An apparatus for wireless communication, comprising:
means for iterating a value of a channel access counter (CAC) based at least in part on a transmission window, wherein a size of the transmission window is based at least in part on at least one of:
a quantity of candidate resources that is available in a slot,
a quantity of slots associated with a transmission of a packet, or
a combination of the quantity of candidate resources that is available in the slot and the quantity of slots associated with the transmission of the packet; and
means for utilizing a channel access mechanism based at least in part on the value of the CAC satisfying a trigger value.

28. The apparatus of claim 27, wherein the size of the transmission window is further based at least in part on at least one of:
a priority associated with the packet,
a quality of service (QoS) value associated with the packet, or
a combination of the priority and the QoS value.

29. The apparatus of claim 27, wherein the value of the CAC has a starting value that is based at least in part on the size of the transmission window.

30. An apparatus for wireless communication at a wireless communication device, comprising:
one or more memories; and
one or more processors, coupled to the one or more memories, configured to cause the wireless communication device to:
identify a value of a channel access counter (CAC) based at least in part on a transmission window, wherein a size of the transmission window is based at least in part on at least one of:
a quantity of candidate resources that is available in a slot,
a quantity of slots associated with a transmission of a packet, or
a combination of the quantity of candidate resources that is available in the slot and the quantity of slots associated with the transmission of the packet; and
utilize a channel access mechanism based at least in part on that the value of the CAC satisfies a trigger value.

31. An apparatus for wireless communication at a wireless communication device, comprising:
one or more memories; and
one or more processors, coupled to the one or more memories, configured to cause the wireless communication device to:
identify a value of a channel access counter (CAC) based at least in part on a starting value of the CAC, wherein the starting value is based at least in part on a size of a transmission window;

utilize a channel access mechanism to select a set of time-frequency resources for a transmission of a packet based at least in part on that the value of the CAC satisfies a trigger value; and transmit the packet via the set of time-frequency resources.

32. An apparatus for wireless communication at a wireless communication device, comprising:

one or more memories; and one or more processors, coupled to the one or more memories, configured to cause the wireless communication device to:

identify a value of a channel access counter (CAC) based at least in part on a fractional value of a quantity of time-frequency resources available in a slot; and utilize a channel access mechanism based at least in part on that the value of the CAC satisfies a trigger value.

* * * * *